INVENTOR
ROBERT CASEY

United States Patent Office 3,529,869
Patented Sept. 22, 1970

---

3,529,869
DRIVE MEANS IN PNEUMATIC TIRE RIM
Robert Casey, Washington, Ill., assignor to Caterpillar Tractor Co., Peoria, Ill., a corporation of California
Filed Aug. 26, 1968, Ser. No. 755,217
Int. Cl. B60b 23/10, 25/14
U.S. Cl. 301—11                    2 Claims

ABSTRACT OF THE DISCLOSURE

Driving connections between the several parts of a rim and the inflated tire which it supports to prevent slippage of the rim parts with respect to each other and with respect to the tire and, thus, to prevent damage to the tire which results from slippage.

---

A conventional tire rim, such as used on large rubber-tired equipment, generally includes a rim base or hub with rim flanges at its opposite edges and a bead seat ring on the outboard edge to permit removal of the outboard rim flange and of the tire. The bead of the tire seats on the hub on the inboard side and on the bead seat ring on the outboard side with sealing contact at both seat areas. However, there is generally no means other than friction to prevent relative rotation of the rim flanges and the hub, though in some rims the bead seat ring is keyed to and driven with the hub.

It is an object of the present invention to key together for driving in unison all parts of the rim structure which contact the tire and, thus, to provide as large an area as possible in friction drive relationship with the tire to minimize tire slippage with respect to the rim. This and other objects of the invention and the manner in which the invention is practiced will be more clearly understood from the following specification wherein reference is made to the accompanying drawing.

Figure 2:
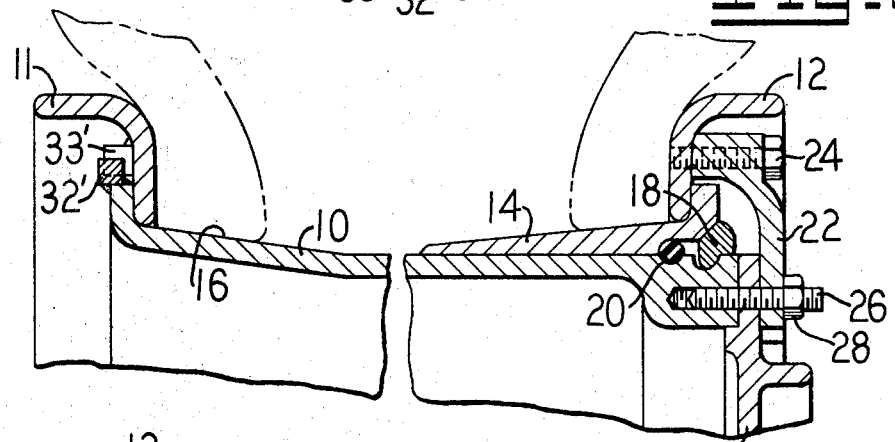
FIG. 2 is an enlarged fragmentary sectional view taken on the line II—II of FIG. 1.

Referring first to FIG. 2 of the drawing, the several parts of the tire rim are shown as a rim base or hub 10, a pair of rim flanges 11 and 12 and a bead seat ring 14. On the inboard side of the tire, the bead, illustrated in broken lines, seats and forms a seal against a bead seat area shown at 16. On the outboard side, the tire bead seats on the bead seat ring 14 which is removable to permit removal of the rim flange 12 and the tire. The bead seat ring is held in place by a snap ring shown at 18, which is of conventional construction, and an O-ring seal 20 prevents escape of air from the interior of the tire between the hub and the bead seat ring.

The tire rim, as described to this point, is conventional and has the disadvantage that upon the application of sudden torque of a high value, the bead seat ring and the rim flanges may be caused to rotate relative to the hub and sometimes relative to the tire. This places excessive stress on the bead seat areas and sometimes breaks the seal, permitting deflation of the tire with resulting damage or complete destruction thereof.

Figure 1:
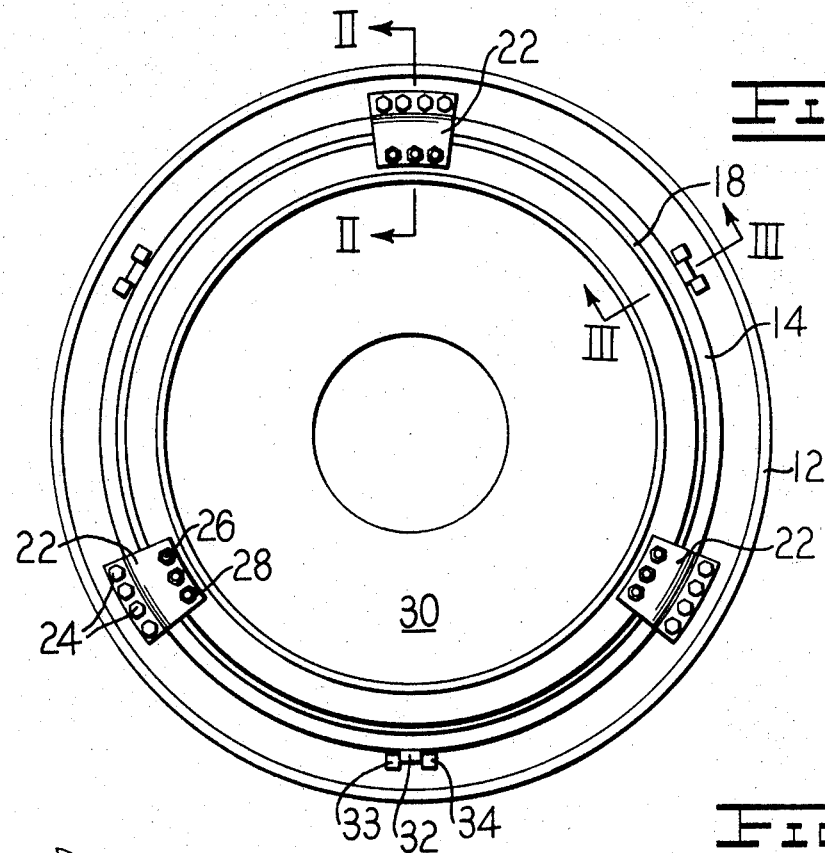
FIG. 1 is a view in elevation of the outboard side of a tire rim embodying the present invention.

Since tires, particularly on large off-highway trucks and other earthmoving equipment, often cost many thousands of dollars each, this is a serious problem which is even further aggravated by the fact that it causes downtime of the equipment involved. The object of the present invention is to provide means for assembling the rim base or hub, the rim flanges and the bead seat ring, all of which have contact with the tire in such a manner that they are driven in unison and, therefore, provide a large frictional area with the tire which tends to prevent its relative rotation with any of the parts. To accomplish this, rim or hub driver plates shown as three in number at 22 in FIG. 1 are secured as shown by cap screws 24 to the outboard rim 12. They are also secured by studs 26 and nuts 28 to the hub 10. A portion of a disc which drives the rim and tire is shown at 30 as clamped between the hub and plate 22 to impart driving movement to the assembly.

Figure 3:
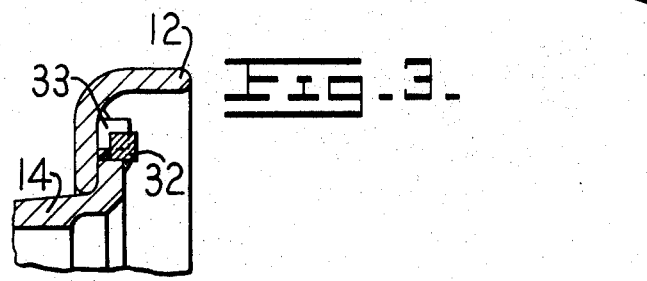
FIG. 3 is a view taken on the line III—III of FIG. 1 but showing only a small portion of the bead seat ring and rim flange in that area.

The inboard rim flange is secured with respect to the hub and the outboard rim flange 12 is secured with respect to the bead seat ring 14 to prevent rotation of the ring by identical securing means. These means are shown for the outboard side in FIGS. 1 and 3 wherein there are several groups of securing means each comprising an abutment member 32 welded to the bead seat ring 14 and two such members 33 and 34 disposed on opposite sides thereof and welded to the rim flange 12. Since the members 33 and 34 embrace the member 32, they prevent relative rotation of the rim flange and bead seat ring. The same principle is employed between the rim flange 11 on the inboard side and the hub 10 utilizing members 32' and 33' positioned as illustrated in FIG. 2. Since both of the rim flanges, the hub and the bead seat ring are keyed against relative rotation, a maximum frictional area is provided between the rim parts and the tire and the tendency of the tire to break loose or move relative to the rim is minimized.

What is claimed is:

1. An improved multipiece pneumatic tire rim assembly comprising:
   a cylindrical rim hub with an outwardly projecting lip at one end and a groove adjacent to its other end;
   a first rim flange axially received on said rim hub and abutting against said lip, which restrains it from axial outboard movement;
   a second rim flange axially received on said rim hub adjacent to said groove;
   a bead seat ring axially reveived on said rim hub and restraining said second rim flange from axial outboard movement;
   key means interlocking said bead seat ring and said second rim flange against relative rotation;
   a snap ring received in said groove in said rim hub restraining said bead seat ring from outboard axial movement on said rim hub by abutting engagement with the latter;
   a plurality of hub driver plates spaced peripherally about said second flange and detachably secured thereto;
   a driving disc; and,
   detachable means securing each of said hub driver plates to said rim hub and said driving disc whereby relative rotation between said second flanges, said bead seat ring and said rim hub is prevented during torque transfer to a pneumatic tire mounted on said assembly.

2. The improved multipiece pneumatic tire rim assembly defined in claim 1 wherein the first rim flange is keyed to said rim hub to prevent relative rotation during torque transfer to a pneumatic tire mounted on said assembly.

References Cited

UNITED STATES PATENTS

| | | | |
|---|---|---|---|
| 1,486,174 | 3/1924 | Williams | 152—408 X |
| 1,957,670 | 5/1934 | Brousseau. | |
| 3,043,358 | 7/1962 | Scott | 152—410 |
| 3,459,252 | 8/1969 | Verdier | 152—410 |

FOREIGN PATENTS

| | | |
|---|---|---|
| 909,537 | 4/1954 | Germany. |
| 1,084,491 | 7/1954 | France. |

RICHARD J. JOHNSON, Primary Examiner

U.S. Cl. X.R.

152—409; 301—63